US006980886B2

(12) United States Patent
Shimoda et al.

(10) Patent No.: US 6,980,886 B2
(45) Date of Patent: Dec. 27, 2005

(54) VENDING MACHINE

(75) Inventors: Toru Shimoda, Isesaki (JP); Takashi Harada, Takasaki (JP); Shigeo Hakoda, Isesaki (JP)

(73) Assignee: Sanden Corp., Gunma (JP)

( * ) Notice: Subject to any disclaimer, the term of this patent is extended or adjusted under 35 U.S.C. 154(b) by 30 days.

(21) Appl. No.: 10/667,468

(22) Filed: Sep. 23, 2003

(65) Prior Publication Data

US 2004/0078113 A1 Apr. 22, 2004

(30) Foreign Application Priority Data

Sep. 30, 2002 (JP) ............................ 2002-285756

(51) Int. Cl.⁷ ............................................ G06F 17/00

(52) U.S. Cl. .......................... 700/232; 221/93; 221/94; 221/155; 221/130

(58) Field of Search ................................ 700/232, 231, 700/240, 242; 221/92, 93, 94, 130, 131, 155

(56) References Cited

U.S. PATENT DOCUMENTS 4,202,468 A * 5/1980 Anderson et al. ............. 221/93
5,555,497 A * 9/1996 Helbling ...................... 705/14
6,115,649 A * 9/2000 Sakata ........................ 700/241
6,161,059 A * 12/2000 Tedesco et al. ............. 700/232
6,424,884 B1 * 7/2002 Brooke et al. .............. 700/232
6,431,395 B1 * 8/2002 San Martin et al. ............ 221/2

FOREIGN PATENT DOCUMENTS

JP 2000-132736 5/2000

* cited by examiner

*Primary Examiner*—Khoi H. Tran
(74) *Attorney, Agent, or Firm*—Banner & Witcoff, LTD

(57) ABSTRACT

A vending machine capable of selecting any one of a first of a fourth mode which make it possible to carry out a commodity and a prize and a fifth mode which makes it possible to carry out only a commodity by a mode selecting device. In a state in which the fifth mode is selected, an ordinary commodity sale in which a selected commodity is executed based on insertion of coins or paper money, and pushing a commodity selecting button 4 is executed. In a state in which any one of the first to the fourth mode is selected, carrying-out of the prize from a prize carrying-out unit is executed in parallel with carrying-out of the commodity or independently.

7 Claims, 16 Drawing Sheets

VENDING MACHINE

BACKGROUND OF THE INVENTION (i) Field of the Invention

The present invention relates to a vending machine for selling a selected commodity based on insertion of coins or a paper money and pushing a commodity selecting button.

(ii) Description of the Related Art

In order to promote the sales of commodities in the vending machine, the methods, for example, as in (a) and (b) described below are carried out.

(a) When a purchaser presses the commodity selecting button of the vending machine, the vending machine sells the selected commodity and draws lots inside. If winning a prize in the lottery, the vending machine provides the purchaser with the commodity for nothing based on pushing the commodity selecting button.

(b) When a special sheet such as a postcard having thereon an attached point seal or winning seal that was attached to the purchased commodity is sent to a manufacturer from the purchaser, the manufacturer provides the applicant with the prize.

However, in the lot drawing method as in the aforesaid (a), the sales profit of the vending machine itself is reduced if the winning probability is made high, because the commodities are provided when winning a prize in the lottery. It is necessary to reduce the winning probability in order to increase the sales profit, but if the winning probability is reduced, the vending machine becomes not more than an ordinary vending machine, and therefore the increase in the ability to pull buying public cannot be expect so much.

On the other hand, in the applying method as in the aforesaid (b), the operation of posting the point seals or the winning seals on the commodities and the operation of checking the applied special sheets or the like are needed, and therefore the cost becomes high. Moreover, the similar commodities are sold at many places other than the vending machines, and therefore this method is not sufficient to increase only the ability to pull the buying public for the vending machine.

SUMMARY OF THE INVENTION

An object of the present invention is to provide a vending machine which is increased in the ability to pull buying public for the vending machine and is capable of contributing to the increase in the sales of the vending machine.

In order to attain this object, a vending machine according to the present invention includes commodity carrying-out means for storing commodities and carrying out a commodity, commodity carrying-out control means for executing carrying-out of the commodity from the commodity carrying-out means based on insertion of coins or a paper money and pushing a commodity selecting button, prize carrying-out means for storing prizes different from the commodities and carrying out a prize, prize carrying-out control means for executing carrying out of the prizes from the prize carrying-out means when a predetermined condition is satisfied, and mode selecting means for selecting any one of a mode which makes it possible to carry out the commodity and the prize and a mode which makes it possible to carry out only the commodity.

According to this vending machine, in a state in which the mode which makes it possible to carry out the commodity and the prize is selected, carrying-out of the prize from the prize carrying-out means is executed in parallel with carrying-out of the commodity or independently when the aforesaid predetermined condition is satisfied. In a state in which the mode which makes it possible to carry out only the commodity is selected, an ordinary commodity vending for selling the selected commodity based on the insertion of coins or a paper money and pushing the commodity selecting button. Namely, by selecting the mode which makes it possible to carry out the commodity and the prize, the ability to pull buying public for the vending machine can be dramatically enhanced to make it possible to contribute to increase in sales. By selecting the modes by the mode selecting means, the commodity and the prize carrying-out method corresponding to the installation place of the vending machine and sales strategy or the like of the commodities can be suitably and easily selected.

The aforementioned object and the other objects of the present invention, features, and advantages become apparent by the following explanation and attached drawings.

DESCRIPTION OF THE PREFERRED EMBODIMENTS

FIG. 1 to FIG. 10 show a first embodiment of the present invention.

Figure 1:
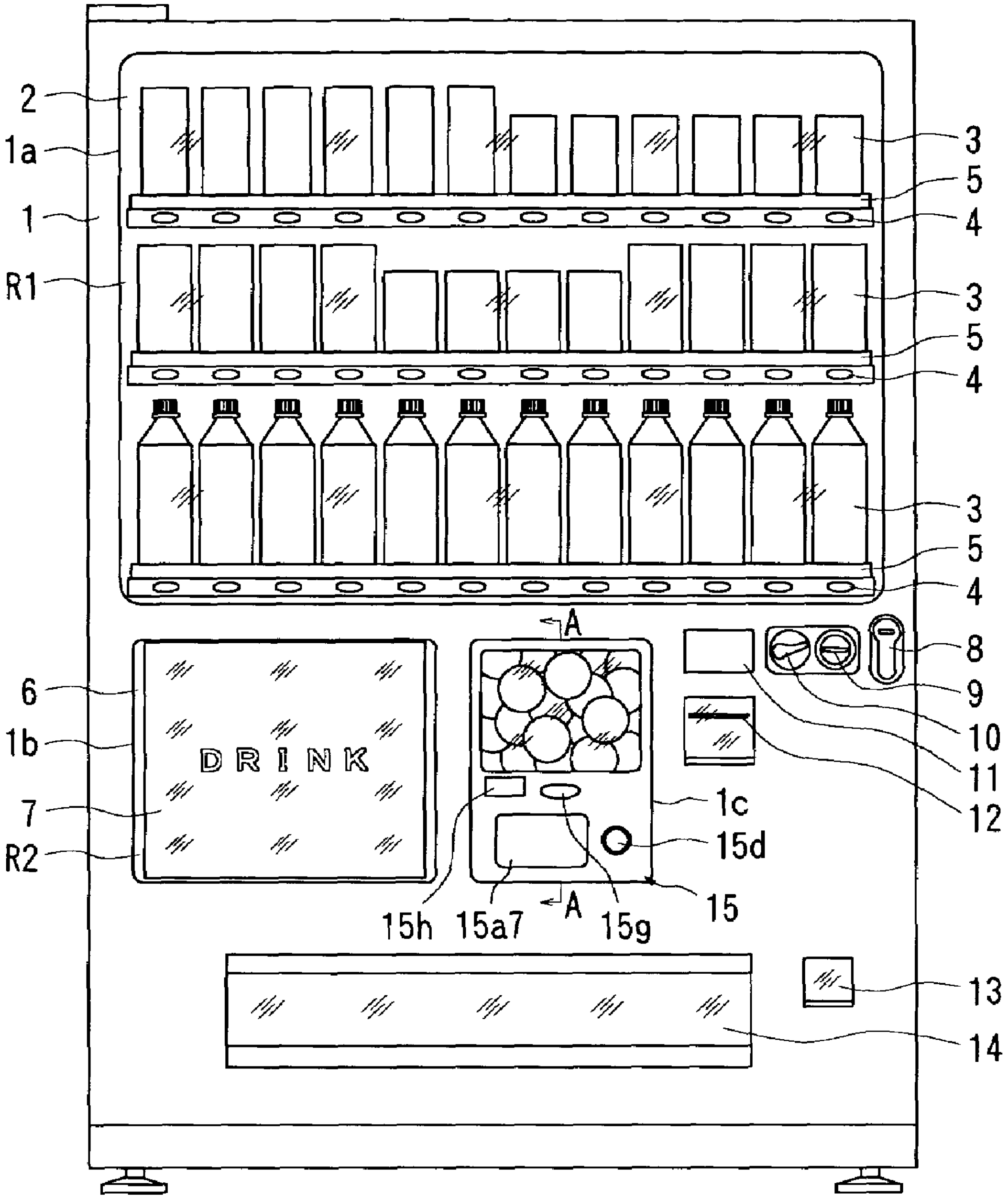
FIG. 1 is a front view of a vending machine showing a first embodiment of the present invention.
Figure 2:
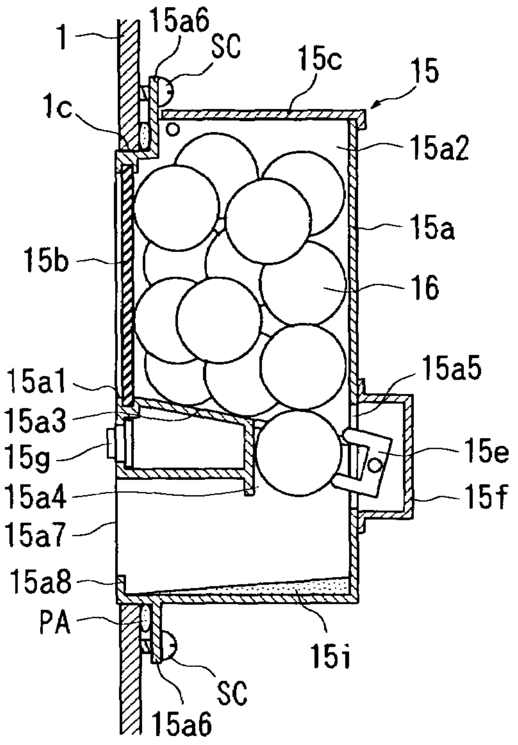
FIG. 2 is an enlarged sectional view taken along the line A—A in FIG. 1.
Figure 3:
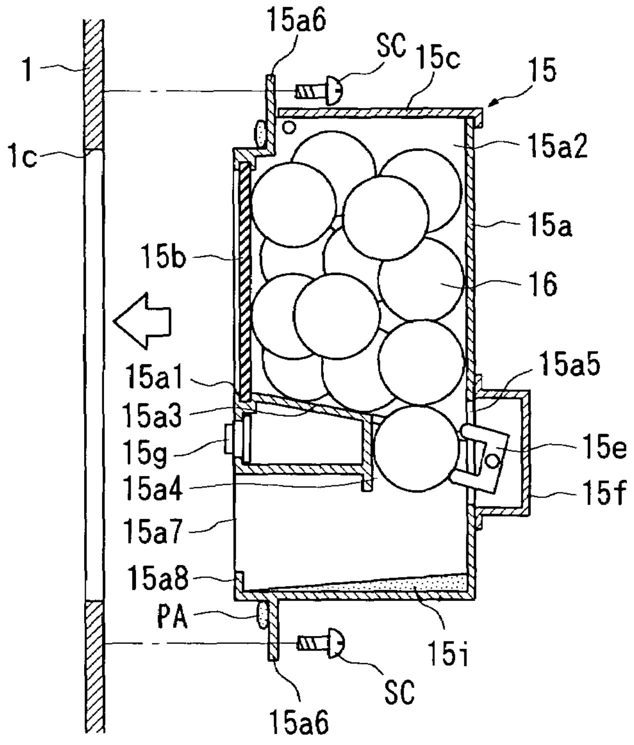
FIG. 3 is an explanatory view of an assembling method of a prize carrying-out unit shown in FIG. 1.
Figure 4A:
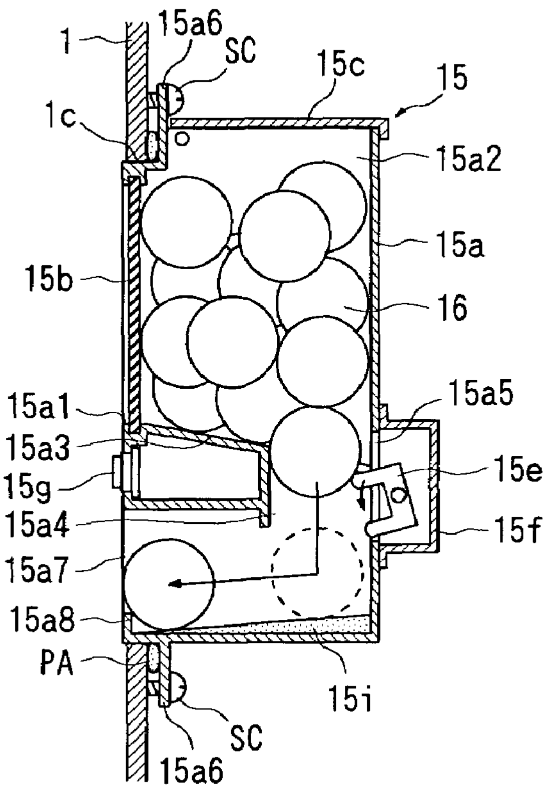
FIG. 4A and FIG. 4B are explanatory views of an operation of the prize carrying-out unit shown in FIG. 1.
Figure 4B:
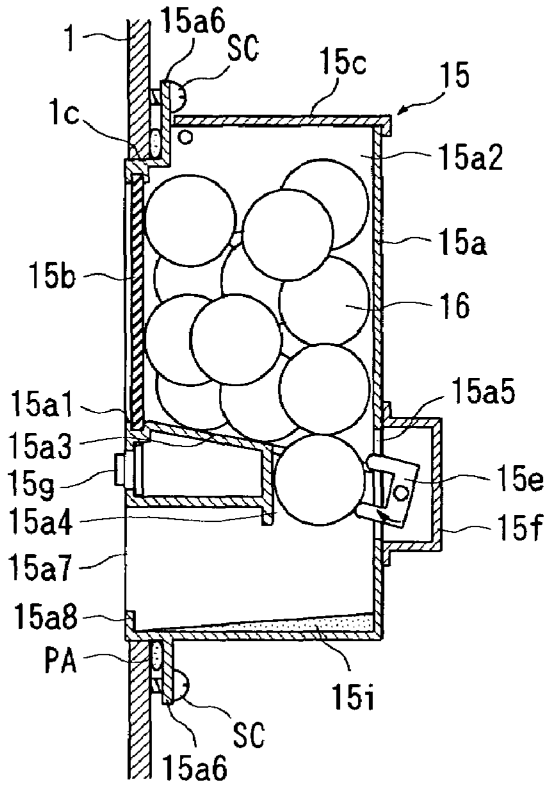
Figure 5:
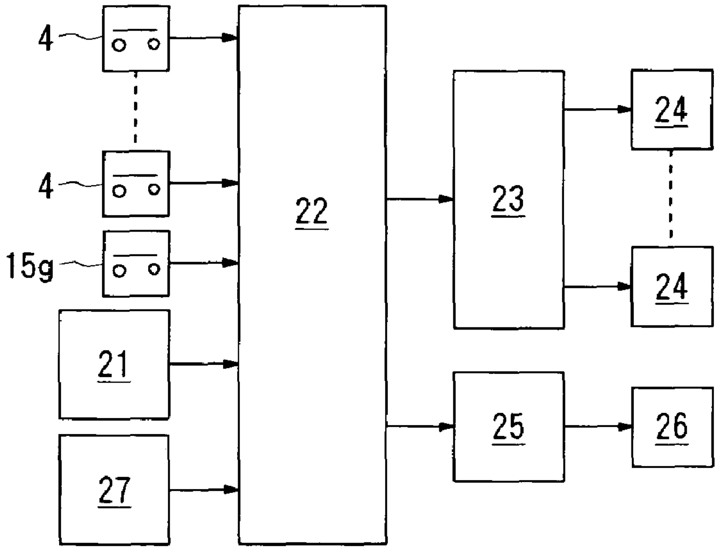
FIG. 5 is a block diagram of a carrying out control system of a commodity and a prize in the vending machine shown in FIG. 1.
Figure 6:
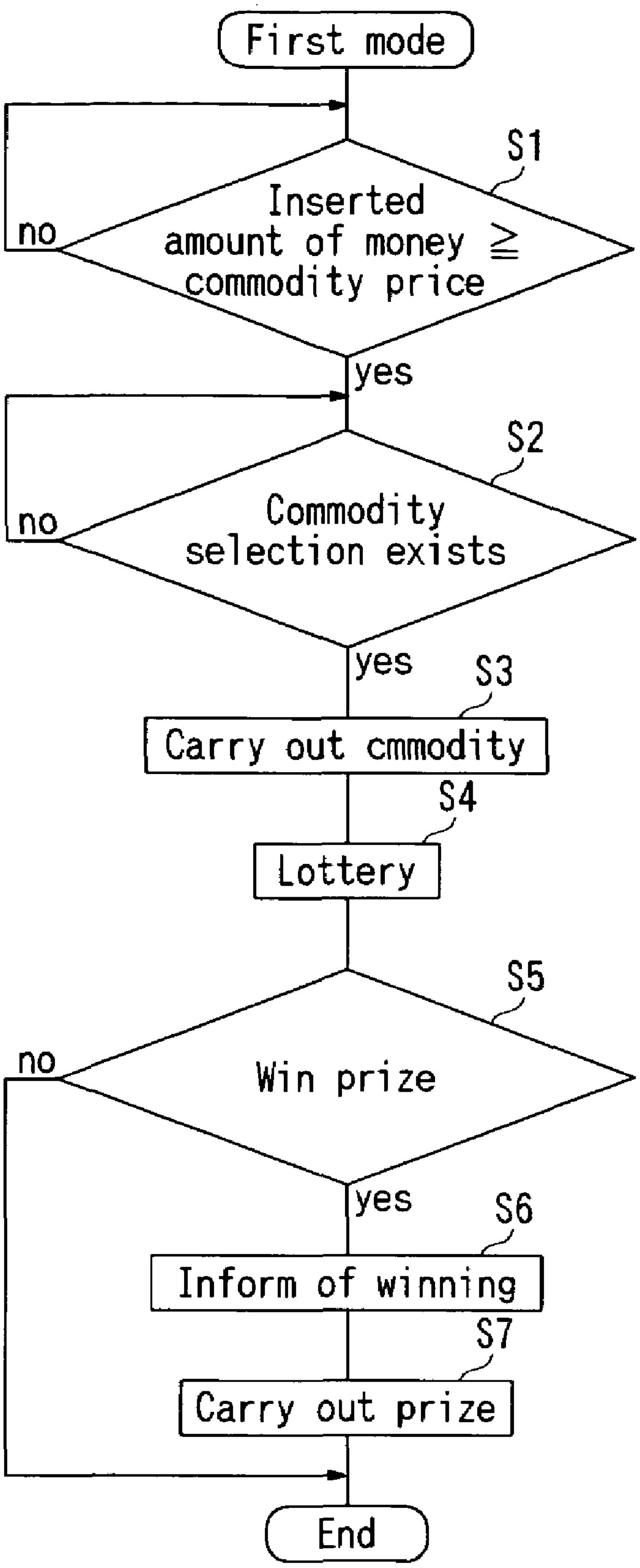
FIG. 6 is a flow chart showing a first mode related to carrying-out of the commodity and the prize.
Figure 7:
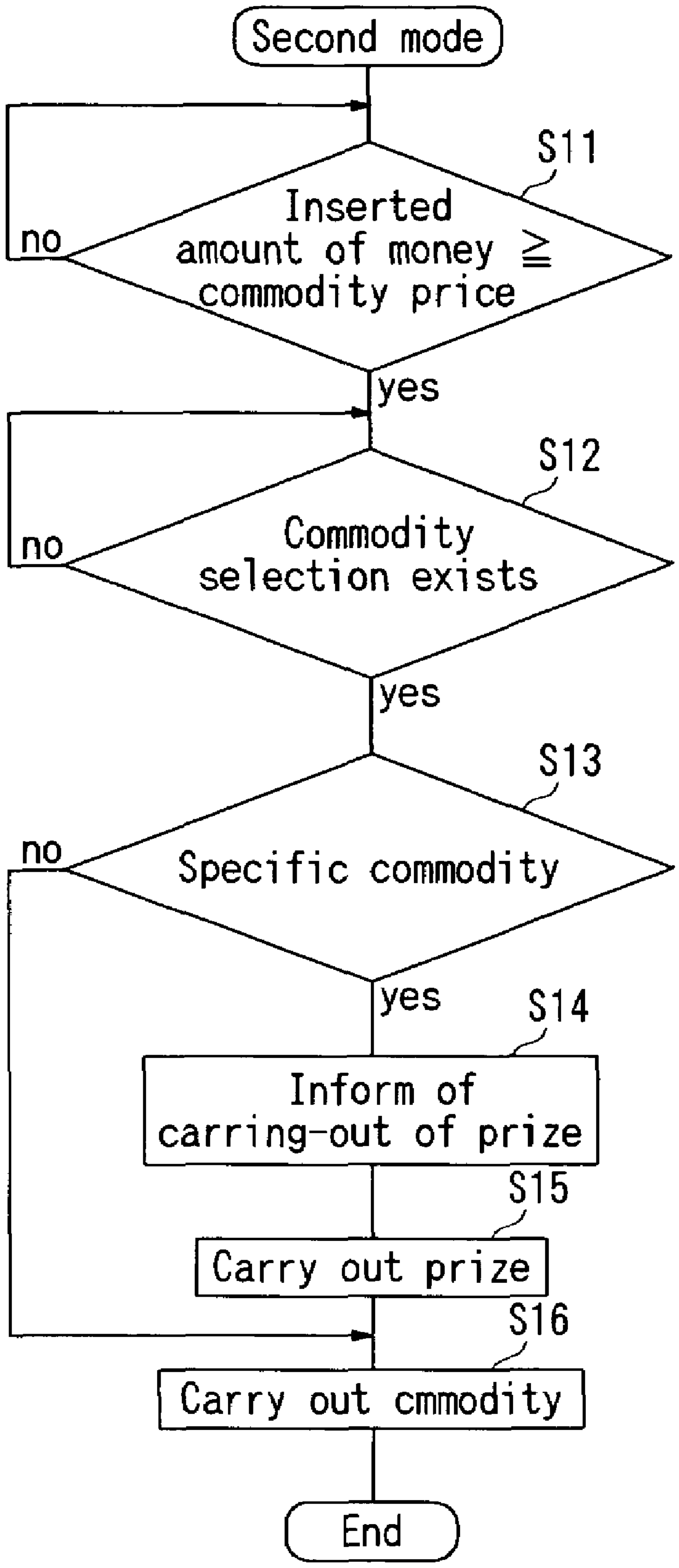
FIG. 7 is a flow chart showing a second mode related to carrying-out of the commodity and the prize.
Figure 8:
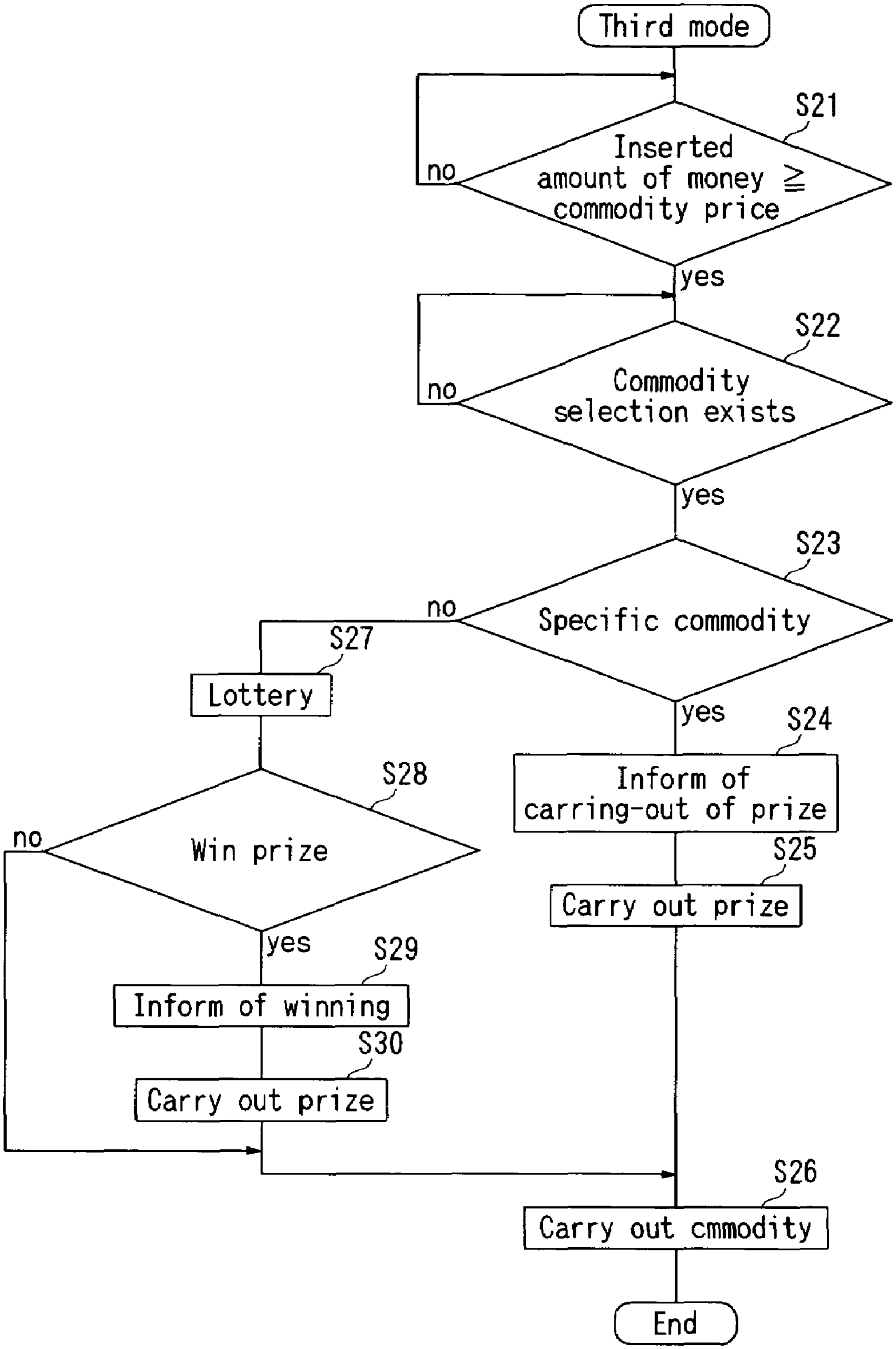
FIG. 8 is a flow chart showing a third mode related to carrying-out of the commodity and the prize.
Figure 9:
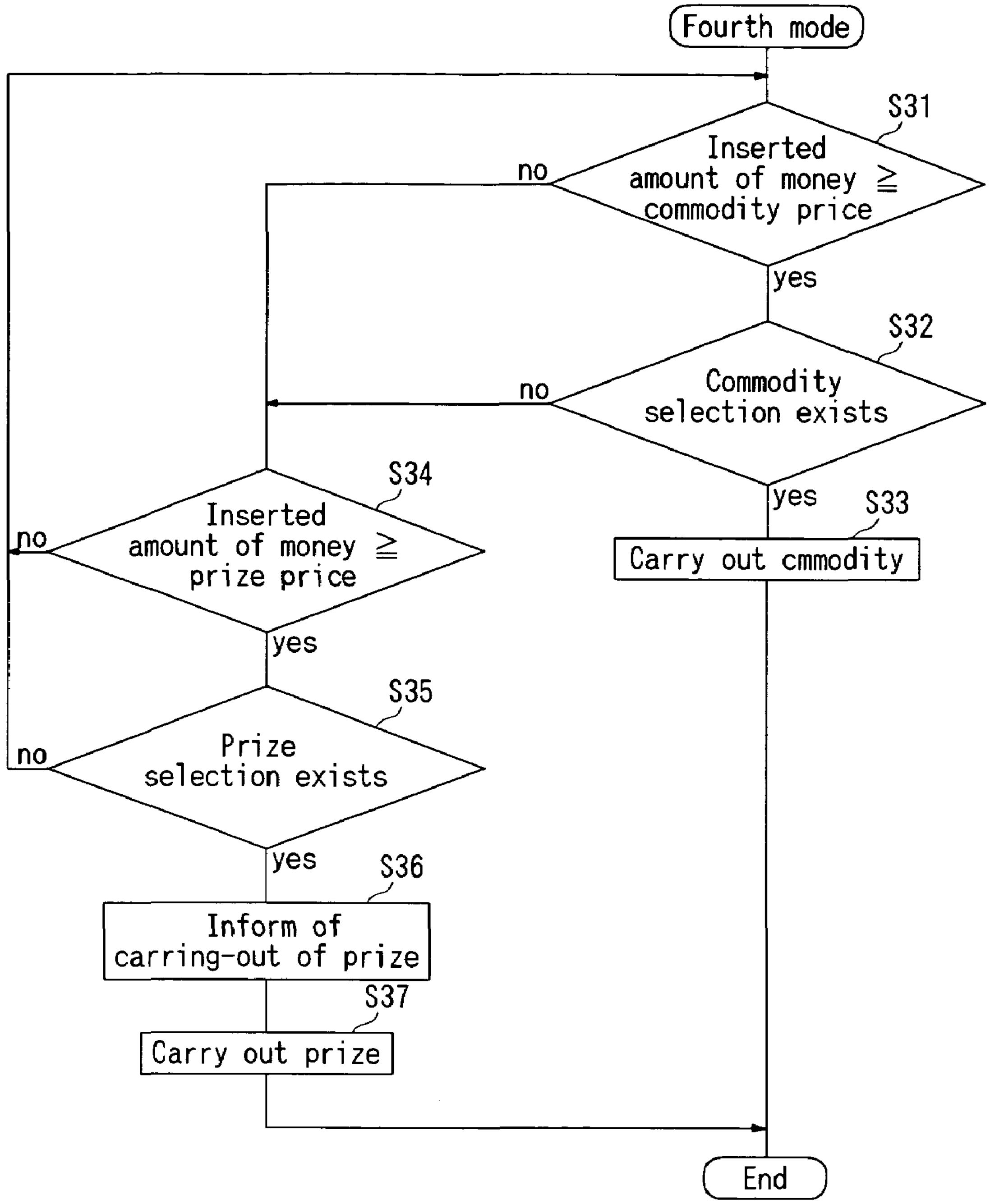
FIG. 9 is a flow chart showing a fourth mode related to carrying-out of the commodity and the prize.
Figure 10:
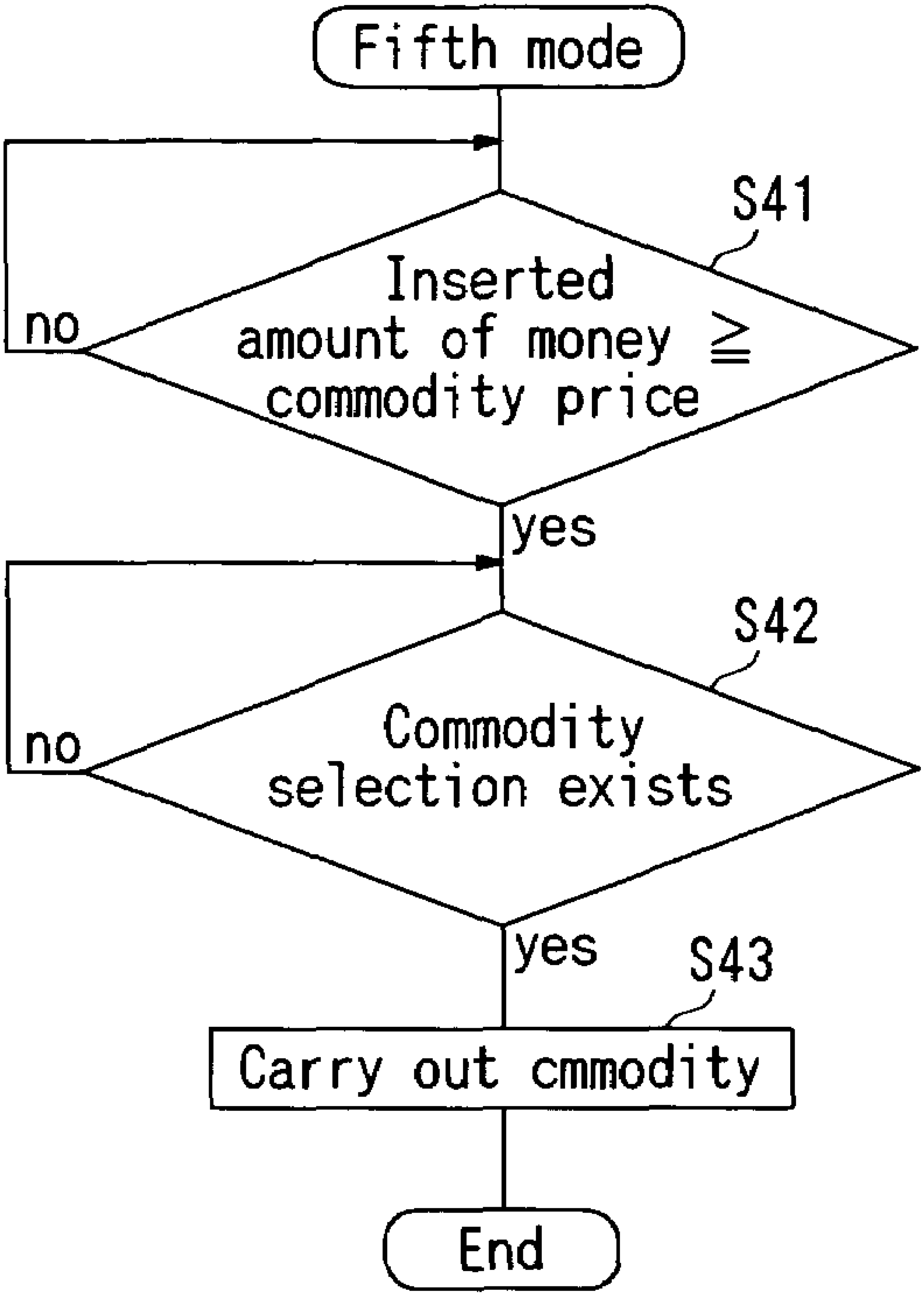
FIG. 10 is a flow chart showing a fifth mode related to carrying-out of the commodity.

FIG. 1 is a front view of a vending machine, FIG. 2 is an enlarged sectional view taken along the line A—A in FIG. 1, FIG. 3 is an explanatory view of an assembling method of a prize carrying-out unit, FIG. 4A and FIG. 4B are explanatory views of an operation of the prize carrying-out unit, FIG. 5 is a block diagram of a carrying-out system of a commodities and a prize, FIG. 6 is a flow chart showing a first mode according to carrying-out of the commodity and the prize, FIG. 7 is a flow chart showing a second mode according to carrying-out of the commodity and the prize, FIG. 8 is a flow chart showing a third mode according to carrying-out of the commodity and the prize, FIG. 9 is a flow chart showing a fourth mode according to the commodity and the prize, and FIG. 10 is a flow chart showing a fifth mode according to carrying-out of the commodity.

First, an entire construction of the vending machine and a construction of the prize carrying-out unit, and the operation will be explained with reference to FIG. 1 to FIG. 4.

The vending machine shown in FIG. 1 includes a cabinet (not shown) with thermal insulating properties with its front surface being opened. A plurality of commodity columns (not shown) constituted of serpentine type columns and the like are placed in a heat insulation chamber (not shown) provided inside the cabinet. A commodity carrying-out mechanism (not shown) for carrying out stored commodities one by one with a solenoid (not shown, refer to reference numeral 24 in FIG. 5) as a driving source is provided at a lower part of each of the commodity columns. A guiding chute (not shown) for leading the carried-out commodity to a commodity output port 14 is provided at a lower side of each of the commodity carrying-out mechanisms.

Incidentally, in the first embodiment, the aforesaid commodity column, the commodity carrying-out mechanism and the solenoid 24 construct "commodity carrying-out means" for storing and carrying out the commodities, and a number of packaged drinks such as canned drinks, bottled drinks, and drinks contained in plastic bottles are stored in each of the commodity columns as commodities.

An evaporator, a heater, a fan and the like (all of them are not shown) to cool or heat the commodities stored in each of the commodity columns are placed at a lower side of the guiding chute or a back side of the commodity columns, and a compressor, a condenser, a fan and the like (all of them are not shown) constructing a cooling unit with the evaporator are placed in a machinery room provided at a lower side of a column chamber inside the cabinet.

A main door 1 shown in FIG. 1 is provided at a front face of the cabinet to be openable and closable. An opening 1*a* is formed at an upper part of a front face of the main door 1, and a transparent plate 2 constituted of a transparent resin, glass or the like is attached to this opening 1*a*. A space at a back face side of the transparent plate 2 becomes a sample chamber R1, and samples 3 corresponding to the commodities stored in the aforesaid commodity columns are exhibited to be attachable and detachable.

A commodity selecting button 4 is placed at a front face side of the transparent plate 2 correspondingly to each of the samples 3, and a display part 5 for showing prices of the commodities, cooling and heating state and the like is placed at the back face side of the transparent plate 2 correspondingly to each of the samples 3.

Further, a opening 1*b* is formed at a left side of a lower part of the front face of the main door 1, and a transparent plate 6 constituted of the transparent resin, glass or the like is attached to this opening 1*b*. A space at a back face side of the transparent plate 6 is an advertisement chamber R2, and a poster 7 for commodity advertisement is put up to be attachable and detachable.

A lock 8 for the main door 1, a coin insertion slot 9, a return lever 10, a display part 11 and a paper money insertion port 12 are provided at a right side of the lower part of the front face of the main door 1, and at a lower side from them, a coin return port 13 and a commodity output port 14 are provided.

An opening 1*c* is formed at a center of the lower part of the front face of the main door 1, and a front face portion of a prize carrying-out unit 15 is exposed to this opening 1*c*.

The aforesaid prize carrying-out unit 15 includes a main body 15*a*, a transparent plate 15*b* made of a transparent resin and glass, an opening and closing lid 15*c*, a lamp 15*d*, a carrying-out lever 15*e* having protruded portions at an upper and lower positions, a cover 15*f*, a prize selecting button 15*g*, a display part 15*h* showing a prize price or the like, and a shock absorbing mat 15*i* made of synthetic rubber and the like.

The main body 15*a* has its top face opened, and has a window hole 15*a*1 for mounting the transparent plate 15*b* at a front face thereof. An inner space of the main body 15*a* is defined as a prize storing chamber 15*a*2, and a bottom face 15*a*3 of the prize storing chamber 15*a*2 is inclined toward a prize carrying-out port 15*a*4. A hole 15*a*5 for protruding the upper and lower protruded portions of the carrying-out lever 15*e* toward the prize storing chamber 15*a*2 and the prize carrying-out port 15*a*4 is formed at a back face of the main body 15*a*. Mounting flanges 15*a*6 with screw insertion holes being formed are provided at a perimeter of the front face side of the main body 15*a*, and packing PA made of synthetic rubber or the like are provided at front face sides thereof. A prize output port 15*a*7 is provided at a lower part of the front face of the main body 15*a*, and a stopper 15*a*8 for preventing a prize 16 from slipping off is provided at a lower end thereof.

The aforesaid transparent plate 15*b* is mounted to the window hole 15*a*1 of the main body 15*a*, and the aforesaid opening and dosing lid 15*c* is mounted to the top face opening of the main body 15*a* to be openable and closable. The carrying-out lever 15*e* is placed so that both the protruded portions thereof protrude inward through the hole 15*a*5. The aforesaid carrying-out lever 15*f* is provided to cover the carrying-out lever 15*e*. A solenoid (not shown, refer to reference numeral 26 in FIG. 5) for normally and reversely rotating the carrying-out lever 15*e* in a predetermined angle range is connected to the carrying-out lever 15*e* via a motion conversion link. The aforesaid prize selecting buttons 15*g* and the aforesaid display part 15*h* are provided at a front face part of the main body 15*a*. The aforesaid shock absorbing mat 15*i* is mounted on a bottom face of the main body 15*a*, and plays a role of protecting the prize 16 that is carried out from a drop impact, and a role of guiding the prize 16 that is carried out toward the prize output port 15*a*7 by its top face inclination.

Incidentally, in the first embodiment, the aforesaid main body 15*a*, a prize carrying-out mechanism (the carrying-out lever 15*e*, the motion conversion link) and the solenoid 26 define "prize carrying-out means" for storing and carrying out the prize, and a number of packaged goods such as dolls, toys and badges are stored in the prize storing chamber 15*a*2 of the main body 15*a* as prizes 16 for sales promotion. As the packages for holding the goods, separable spherical cases made of transparent plastic are preferably used, but the shapes and materials of the packages are not especially limited.

When the aforementioned prize carrying-out unit 15 is mounted inside the main door 1, as shown in FIG. 3, a front face part of the prize carrying-out unit 15 is inserted into the opening 1*c* which is previously formed at the main door 1, and screws SC are screwed into the back face or brackets or the like provided at the back face through the screw insertion holes of the mounting flanges 15*a*6. The mounting flange 15*a*6 and the back face of the main door 1 are joined via the packing PA, and therefore rainwater and the like do not enter an inside of the main door 1 through the opening 1*c*.

It is naturally possible to remove the prize carrying-out unit 15 from the main door 1 by loosening the screws SC after mounting the unit. When the prize carrying-out unit 15 is not used, the opening 1*c* of the main door 1 can be blocked with a special lid plate (not shown) from its back face side or front face side after the unit 15 is removed.

Even if the opening 1*c* is not previously formed at the main door 1, if a sufficient space for forming the opening 1*c* exists at the front face of the main door 1 and a sufficient space for mounting the prize carrying-out unit 15 exists at its back face side, the aforementioned prize carrying-out unit 15 can be mounted to the existing vending machine by performing an operation of forming the opening 1*c* at the main door 1.

The aforementioned prize carrying-out unit 15 can makes only the prize 16, which is restrained from dropping by the lower protruded portion of the carrying-out lever 15*e*, drop on the shock absorbing mat 15*i* under its own weight from the prize carrying-out port 15*a*4, and restrain the following prize 16 from dropping by the upper protruded portion of the lever 15*e*, by rotating the carrying-out lever 15*e* at the standby position shown in FIG. 2 a predetermined angle in a counterclockwise direction to bring it into the state in FIG. 4A. The prize 16 which drops on the shock absorbing mat 15*i* under its own weight is guided toward the prize output port 15*a*7 by the inclination of the top face of the shock absorbing mat 15*i*, and stops at a place where it contacts the stopper 15*a*8. The following prize 16 is restrained from dropping by the lower protruded portion of the carrying-out lever 15*e* by rotating the carrying-out lever 15*e* at the carrying-out position shown in FIG. 4A the predetermined angle in a clockwise direction to return it and bring it into the state in FIG. 4B.

Next, a control system construction related to carrying-out of the commodities and prizes in the vending machine will be explained with reference to FIG. 5.

Reference numeral 4 in FIG. 5 denotes the commodity selecting button provided at the main door 1, reference numeral 15*g* denotes the prize selecting button provided at the prize carrying-out unit 15, reference numeral 21 denotes a money processing machine provided at a back face side of the main door 1 shown in FIG. 1, reference numeral 22 denotes a control unit constructed by a microcomputer, reference numeral 23 denotes a commodity carrying-out diving unit, reference numeral 24 denotes the solenoid for diving the commodity carrying-out mechanism of each of the commodity columns, reference numeral 25 denotes a prize carrying-out diving unit, reference numeral 26 denotes the solenoid for driving the prize carrying-out mechanism (the carrying-out lever 15*e*, the motion conversion link) of the prize carrying-out unit 15, and reference numeral 27 denotes a mode selecting device for manually selecting five kinds of modes.

The money processing machine 21 detects the truth of the coins inserted through the coin insertion slot 9 of the main door 1 and the truth of paper money inserted through the paper money insertion port 12, calculates the inserted amount of money, and issues a signal corresponding to the inserted amount of money to the control unit 22.

The control unit 22 stores five kinds of programs related to carrying-out of the commodity and prize in memory, and selects the program to be used based on a mode selecting signal from the mode selecting device 27. This control unit 22 issues a commodity carrying-out signal to the commodity carrying-out driving unit 23 based on signals from the money processing machine 21 and the commodity selecting button 4 following the selected program, and also issues the prize carrying-out signal to the prize carrying-out driving unit 25 when predetermined conditions are satisfied.

The commodity carrying-out driving unit 23 issues a signal to operate the commodity carrying-out mechanism of the predetermined commodity column to the solenoid 24 based on the commodity carrying-out signal from the control unit 22. The prize carrying-out driving unit 25 issues a signal to operate the prize carrying-out mechanism (the carrying-out lever 15*e*, the motion conversion link) of the prize carrying-out unit 15 to the solenoid 26 based on the prize carrying-out signal from the control unit 22.

The mode selecting device 27 includes a manual selecting device such as a dial and a switch, and issues a mode selecting signal corresponding to a selecting position of the manual selecting device to the control unit 22.

Next, five kinds of modes which can be carried out in the aforementioned vending machine will be explained with reference to FIG. 6 to FIG. 10.

The aforementioned vending machine can selectively carry out five kinds of modes by the mode selecting device 27. A first mode is a mode for drawing lots when a commodity is selected and carrying out a prize with the selected commodity when the prize is won. A second mode is a mode for carrying out a prize with a selected commodity without exception when the predetermined commodity is selected. A third mode is a mode for carrying out a prize with a selected commodity without exception when the predetermined commodity is selected, and drawing lots when the commodity other than the predetermined commodity is selected and carrying out the prize with the selected commodity when the prize is won. A fourth mode is a mode for selling the prizes for a predetermined amount of money similarly to the other commodities. A fifth mode is a mode for performing normal sales of only the commodities when the prize carrying-out unit 15 is not used or the prize carrying-out unit 15 is removed.

When the first mode is selected, as shown in FIG. 6, it is determined whether or not the amount of money inserted through the coin insertion slot 9 or the paper money insertion port 12 is not less than a commodity place first, and then it is determined whether or not the commodity selection is made by pushing the commodity selecting button 4 (steps S1 and S2 in FIG. 6).

When the inserted amount of money is not less than the commodity price and the commodity selection is made, the commodity carrying-out mechanism of the commodity column storing the selected commodity is operated and the commodity is carried out (step S3 in FIG. 6). The commodity carried out of the predetermined commodity column is guided to the commodity output port 14 through the guiding chute.

Lots are drawn according to a predetermined drawing lots program substantially at the same time as the carrying out of the commodity, when the prize is won, the purchaser is informed of the winning of the prize by lighting of the front face lamp 15*d* of the prize carrying-out unit 15, a sound or the like, and the prize is carried out by operating the prize carrying-out mechanism of the prize carrying-out unit 15 (steps S4 to S7 in FIG. 6).

The same carrying-out operation as described above can be performed even when the drawing of lots in step S4 is performed between steps S2 and S3 in FIG. 6. The drawing of lots in step S4 may be carried out only when the commodity selecting button 4 corresponding to a special commodity such as, for example, a new product or a recommended product is pressed. In this case, it is desirable to adhere an indicator object such as a sticker describing to the effect that lots are drawn only when a special commodity is purchased onto the main door 1, or exhibit the indicator object describing that effect in the advertising chamber R2.

When the second mode is selected, as shown in FIG. 7, it is determined whether or not the amount of money inserted through the coin insertion slot 9 or the paper money insertion port 12 is not less than the commodity price, and subsequently it is determined whether or not the commodity is selected by pressure on the commodity selecting button 4 (steps S11 and S12 in FIG. 7).

When the inserted amount of money is not less than the commodity price and the commodity is selected, it is determined whether or not the selected commodity is a special commodity, for example, a new product, a recommended product or the like, and when it is the special commodity, the purchaser is informed of carrying-out of the prize by flashing of the front face lamp 15*d* of the prize carrying-out unit 15, a sound or the like, and the prize is carried out by operating the prize carrying-out mechanism of the prize carrying out unit 15 (steps S13 to S15 in FIG. 7). Substantially at the same time as this carrying-out of the prize, the commodity is carried out by operating the commodity carrying-out mechanisms of the commodity column storing the selected commodity (step S16 in FIG. 7). The commodity carried out of the predetermined commodity column is guided to the commodity output port 14 through the guiding chute.

When it is determined that the selected commodity is not the special commodity in the aforesaid step S13, the prize is not carried out, and only the commodity is carried out by operating the commodity carrying-out mechanism of the commodity column storing the selected commodity (step S16 in FIG. 7).

The same carrying-out operation as described above can be performed by performing the carrying-out of the commodity in step S16 between steps S12 and S13 in FIG. 7. When the prize is carried out without exception when the special commodity is purchased as in the second mode, it is desirable to adhere an indicator object such as a sticker, which describes to the effect that the prize is carried out only when the special commodity is purchased, onto the main door 1, or exhibit an indicator object, which describes to that effect, in the advertising chamber R2.

When the third mode is selected, as shown in FIG. 8, it is determined whether or not the amount of money inserted through the coin insertion slot 9 or the paper money insertion port 12 is not less than the commodity price, and subsequently it is determined whether or not a commodity is selected by pushing the commodity selecting button 4 (steps S21 and S22 in FIG. 8).

When the inserted amount of money is not less than the commodity price and the commodity is selected, it is determined whether or not the selected commodity is the special commodity, for example, a new product, a recommended commodity, or the like, and when it is the special commodity, the purchaser is informed of carrying-out of the prize by flashing of the front face lamp 15*d* of the prize carrying-out unit 15, a sound or the like, and the prize is carried out by operating the prize carrying-out mechanism of the prize carrying-out unit 15 (steps S23 to S25 in FIG. 8). Substantially at the same time as this carrying-out of the prize, the commodity is carried out by operating the commodity carrying-out mechanism of the commodity column storing the selected commodity (step S26 in FIG. 8). The commodity, which is carried out of the predetermined commodity column, is guided to the commodity output port 14 through the guiding chute.

When it is determined that the selected commodity is not the special commodity in the aforesaid step S23, namely, when the commodity other than the special commodity is selected, lots are drawn according to a predetermined lots drawing program. If the purchaser wins the prize, the purchaser is informed of the winning by flashing of the front face lamp 15*d* of the prize carrying-out unit 15, a sound, or the like, and the prize is carried out by operating the prize carrying-out mechanism of the prize carrying-out unit 15 (steps S27 to S30 in FIG. 8). Substantially at the same time as carrying-out of the prize, commodity is carried out by operating the commodity carrying-out mechanism of the commodity column storing the selected commodity (step S26 in FIG. 8). The commodity, which is carried out of the predetermined commodity column, is guided to the commodity output port 14 through the guiding chute.

The same carrying-out operation as described above can be performed by performing the carrying-out of the commodity in step S26 between the steps S22 and S23 in FIG. 8. When the prize is carried out without exception when the special commodity is purchased, and the prize is carried out by the drawing of lots when the commodity other than the special commodity is purchased as in the third mode, it is desirable to adhere the indicator object such as a sticker, which describes to the effect that the prize is carried out only when the special commodity is purchased, and when the commodity other than the special commodity is purchased, a lottery is held, onto the main door 1, or the indicator object, which describes to that effect, in the advertisement chamber R2.

When the fourth mode is selected, as shown in FIG. 9, it is determined whether or not the inserted amount of money through the coin insertion slot 9 or the paper money insertion port 12 is not less than the commodity price, and subsequently, it is determined whether or not the commodity is selected by pushing pressure of the commodity selecting button 4 (steps S31 and S32 in FIG. 9).

When the inserted amount of money is not less than the commodity price and the commodity is selected, the commodity is carried out by operating the commodity carrying-out mechanism of the commodity column storing the selected commodity (step S33 in FIG. 9). The commodity, which is carried out of the predetermined commodity column, is guided to the commodity output port 14 through the guiding chute.

In parallel with the above description, it is determined whether or not the inserted amount of money through the coin insertion slot 9 or the paper money insertion port 12 is not less than the price of the prize, and subsequently, it is determined whether or not the prize is selected by pushing the prize selecting button 15*g* (steps S34 and S35 in FIG. 9).

When the inserted amount of money is not less than the price of the prize, and the prize is selected, the purchaser is informed of carrying-out of the prize by flashing of the front face lamp 15*d* of the prize carrying-out unit 15, a sound, or the like, and the prize is carried out by operating the prize carrying-out mechanism of the prize carrying-out unit 15 (steps S36 and S37 in FIG. 9).

When the fifth mode is selected, as shown in FIG. 10, it is determined whether the inserted amount of money through the coin insertion slot 9 or the paper money insertion port 12 is not less than the commodity price first, and subsequently, it is determined whether or not the commodity is selected by pushing the commodity selecting button 4 (steps S41 and S42 in FIG. 10).

When the inserted amount of money is not less than the commodity price and the commodity is selected, the commodity is carried out by operating the commodity carrying-out mechanism of the commodity column storing the selected commodity (step S43 in FIG. 10). The commodity, which is carried out of the predetermined commodity column, is guided to the commodity output port 14 through the guiding chute.

According to the first embodiment, any one of the first to the fourth mode, which make it possible to carry out the commodity and the prize, and the fifth mode, which makes it possible to carry out only the commodity, can be selected by the mode selecting device 27. To be more precise, in the state in which the fifth mode is selected, ordinary commodity sales for selling the selected commodity based on the insertion of coins or paper money and the pushing the commodity selecting button 4 can be performed, and in the state in which any one of the first to the fourth mode is selected, the carrying-out of the prize from the prize carrying-out unit 15 can be performed in parallel with or independently of the carrying-out of the commodity when the predetermined condition is satisfied.

As for the predetermined conditions related to the carrying-out of the prize, winning of the prize by the drawing of lots at the time of selection of the commodity (the first mode), selection of the special commodity at the time of selection of the commodity (the second mode), any one of selection of the special commodity at the time of selection of the commodity and winning of the prize by drawing of lots at the time of selection of the commodity other than the special commodity (the third mode), and the inserted amount of money≧the prize price and pushing the prize selecting button (the fourth mode) can be properly selected, and when each of the conditions is satisfied, the prize 16 different from the commodity can be carried out with or independently of the commodity.

If the items less expensive than the commodities are prepared as the prize 16, it is possible to make the winning probability sufficiently high in the first mode and the third mode, when the special commodity is purchased as in the second mode and the third mode, the prize can be provided without exception, and if it is made possible to sell the commodity independently as in the fourth mode, the demand of the purchaser requiring only the prize can be satisfied, whereby the ability of pulling buying public for the vending machine is enhanced dramatically and can considerably contribute to the increase in sales.

Five kinds of modes can be selectively carried out by the mode selecting device 27, and therefore the commodity and prize carrying-out method corresponding to the installation place of the vending machine, sales strategy of the commodity, and the like can be properly and easily selected.

Further, the transparent plate 15*b* of the prize carrying-out unit 15 is exposed to the outside through the opening 1*c* of the main door 1, and the prize 16 stored in the prize storing chamber 15*a*2 and its content is made visible from the outside, thus making it possible to enhance the power of pulling buying public for the vending machine by the visual effect.

Since the vending machine can be made to have both the function of selling the commodity and the function of selling the prize 16 in the case of the fourth mode, installation of the special machine for selling the prize 16 is made unnecessary to make it possible to utilize the machine installation space effectively.

Since the prize carrying-out unit 15 can be mounted to the existing vending machine by performing the operation of forming the opening 1*c* at the main door 1 even if the opening 1*c* is not previously formed at the main door 1, the same function can be easily given to the existing vending machine which does not have the prize carrying-out function and the existing vending machine can be changed to that with higher power of pulling buying public.

Figure 11:
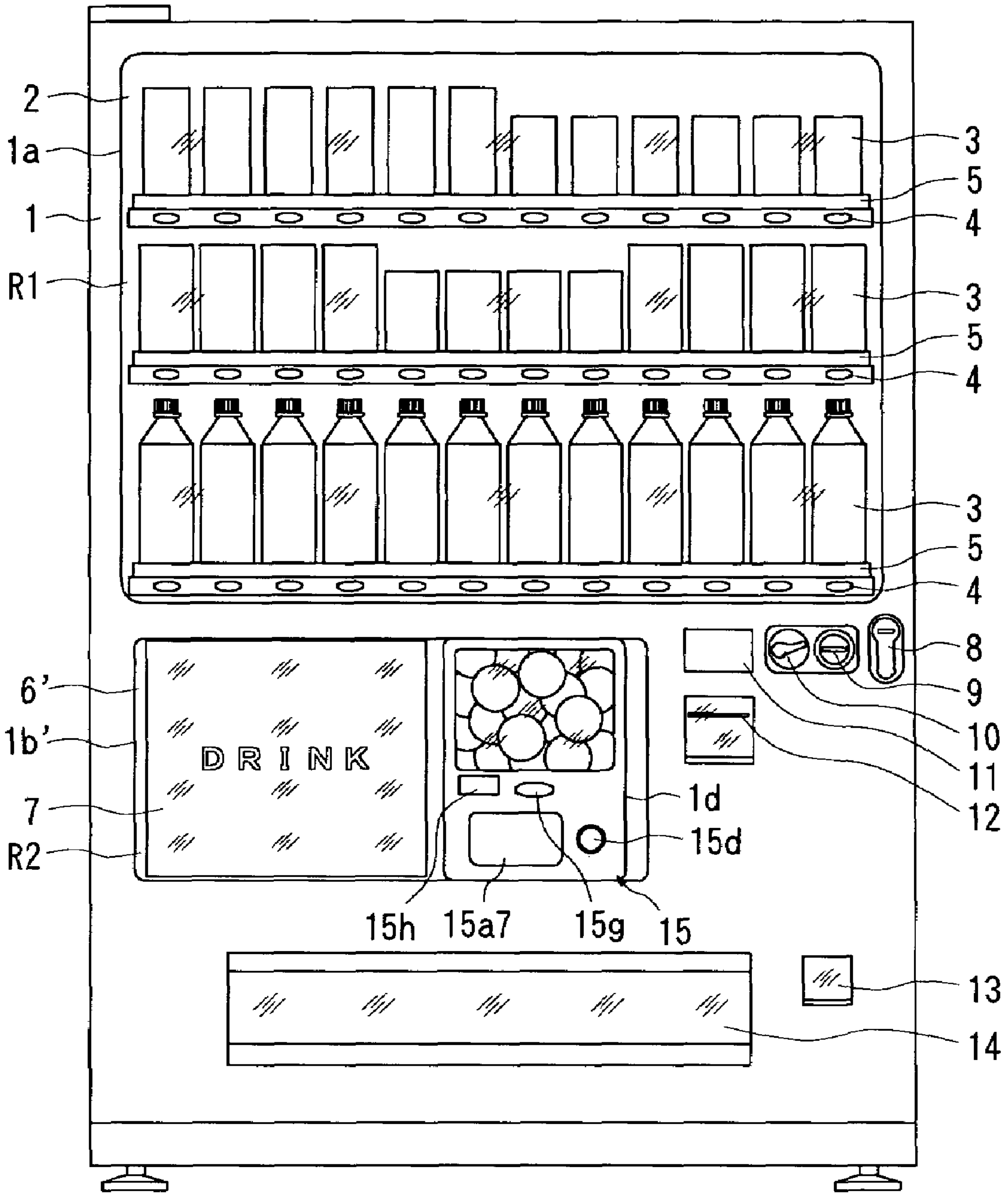
FIG. 11 is a front view of a vending machine showing a second embodiment of the present invention.

FIG. 11 shows a second embodiment of the present invention.

The point in which the second embodiment differs from the aforementioned first embodiment is the point that an opening 1*d* is formed at a transparent plate 6' of the advertisement chamber R2, a front face portion of the prize carrying-out unit 15 is inserted into the opening 1*d* from a back face side of this opening 1*d*, and the screws SC are screwed into a back face of the main door 1, or brackets or the like provided at the back face through the screw insertion holes of the mounting flanges 15*a*6, whereby the prize carrying-out unit 15 is mounted to the main door 1. The other construction is the same as the first embodiment, and therefore the explanation thereof will be omitted.

According to the second embodiment, an opening 1*b*' for the advertisement chamber R2 is widely provided at the main door 1, and even when the space for forming the opening 1*c* for the prize carrying-out unit 15 does not exist at the front face of the main door 1 as in the first embodiment, the prize carrying-out unit 15 can be mounted to the main door 1 by utilizing the transparent plate 6' of the advertisement chamber R2. The other operational effects are the same as in the first embodiment.

Figure 12:
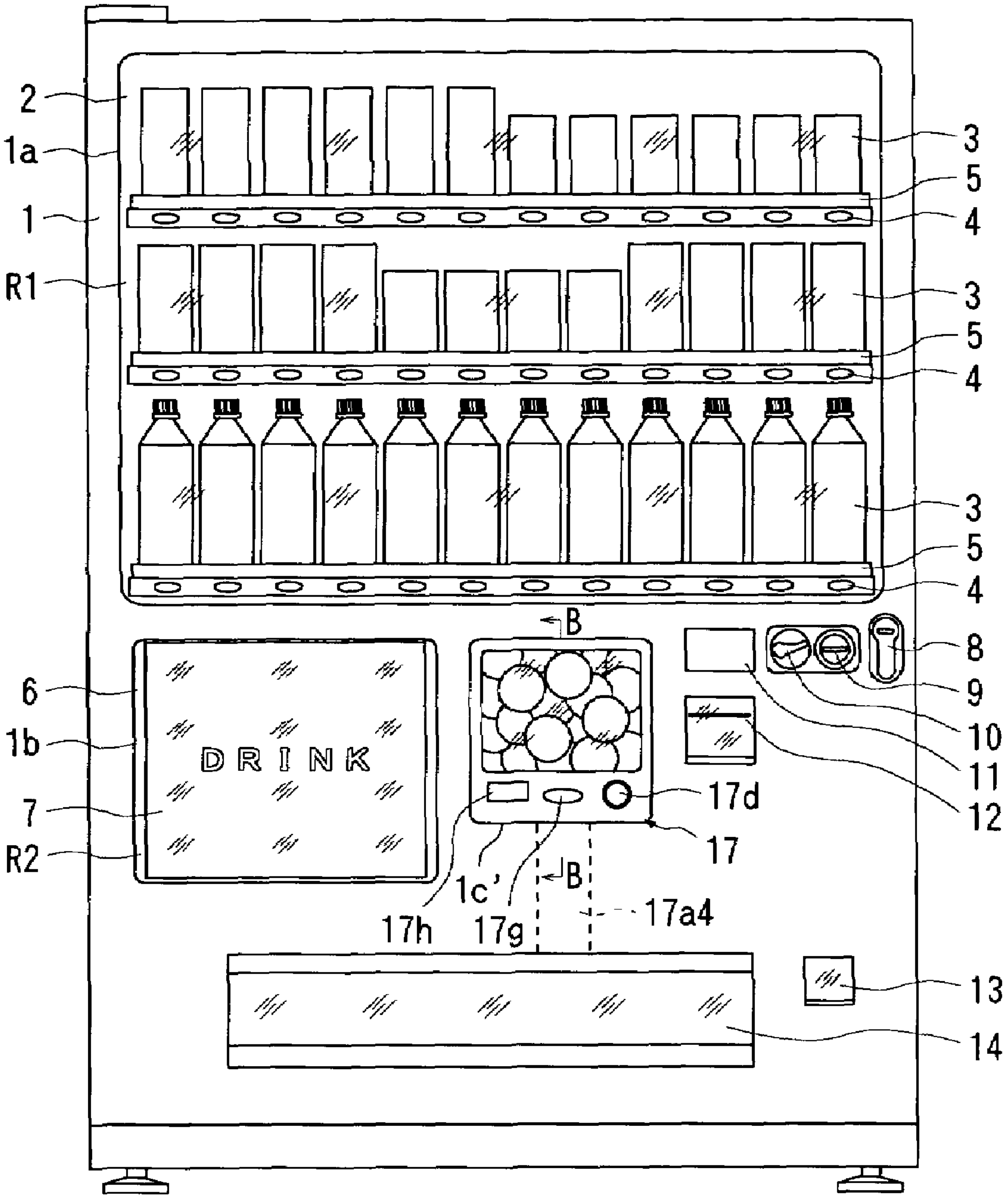
FIG. 12 is a front view of a vending machine showing a third embodiment of the present invention.
Figure 13:
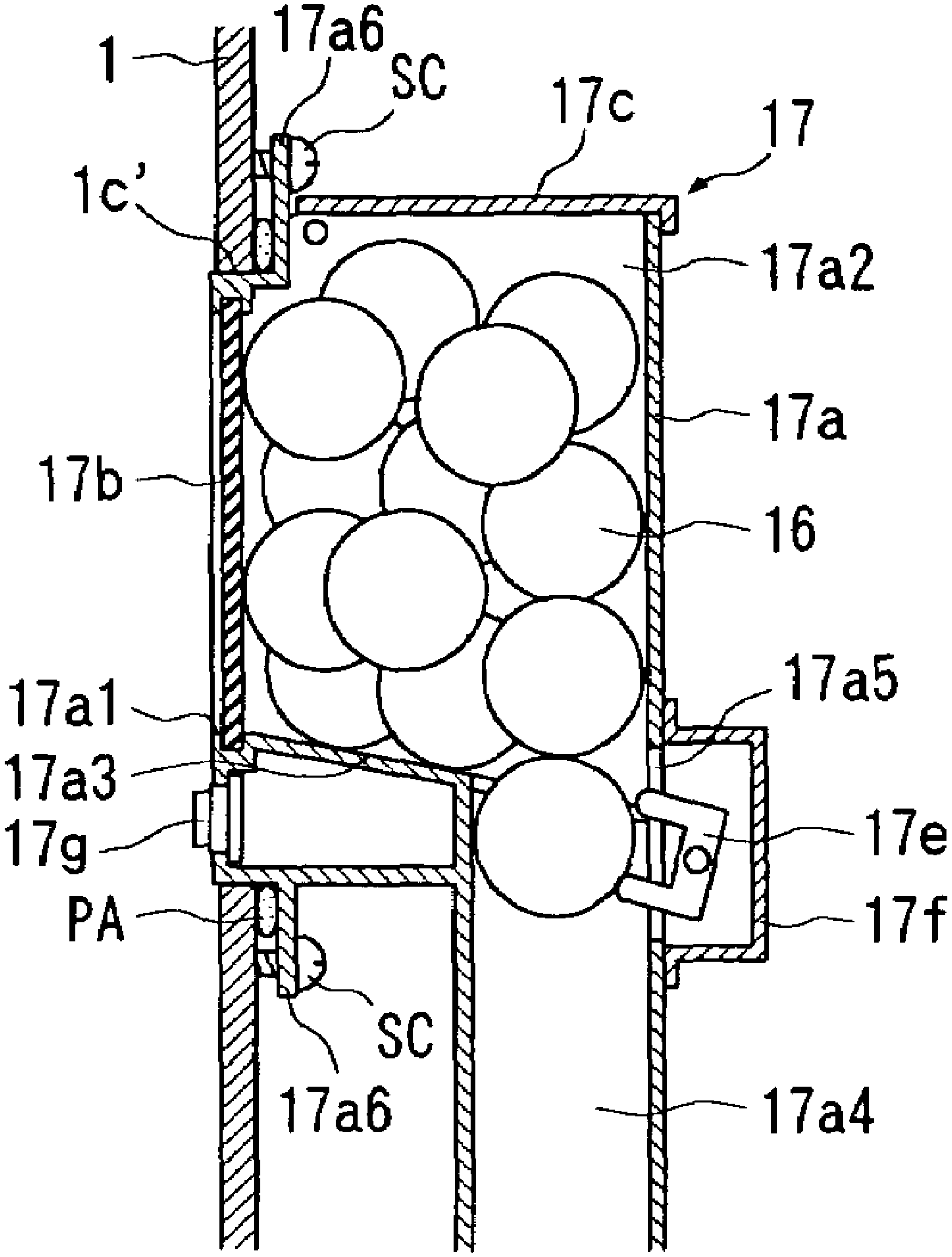
FIG. 13 is an enlarged sectional view taken along the line B—B in FIG. 12.

FIG. 12 and FIG. 13 show a third embodiment of the present invention.

The points in which the third embodiment differs from the aforementioned first embodiment are the point that a prize carrying-out unit 17, which does not have the prize output port at the front face, is used, the point that an opening 1*c*′ for mounting the prize carrying-out unit 17, which is provided at the main door 1, is made smaller than the opening 1*c* of the first embodiment, and the point that a prize carrying-out port 17*a*4 of the prize carrying-out unit 17 is extended downward to communicate with the commodity output port 14. The other constructions are the same as the first embodiment and the explanation thereof will be omitted. A shock absorbing mat (not shown) made of synthetic rubber or the like to protect the prize 16, which is carried out of the prize carrying-out unit 17 through the prize carrying-out port 17*a*4, is provided at a bottom face of the commodity output port 14.

The aforesaid prize carrying-out unit 17 includes a main body 17*a*, a transparent plate 17*b* made of a transparent resin, glass, or the like, an opening and closing lid 17*c*, a lamp 17*d*, a carrying-out lever 17*e* having protruded portions at an upper and lower position, a cover 17*f*, a prize selecting button 17*g* and a display part 17*h* for showing the price of the prize or the like.

The main body 17*a* has a top face opened, and has a window hole 17*a*1 for mounting the transparent plate 17*b* on a front face thereof. An inner space of the main body 17*a* is constructed as a prize storing chamber 17*a*2, and a bottom face 17*a*3 of the prize storing chamber 17*a*2 is inclined toward the prize carrying-out port 17*a*4. A hole 17*a*5 for protruding the upper and lower protruded portions of the carrying-out lever 17*e* toward the prize storing chamber

**17*a*2 and the prize carrying-out port 17*a*4 is formed at a back face of the main body 17*a*. Mounting flanges 17*a*6 with screw insertion holes being formed are provided at a perimeter of a front face side of the main body 17*a***, and packing PA made of synthetic rubber or the like are provided at front face sides thereof.

The aforesaid transparent plate **17*b* is mounted to the window hole 17*a*1 of the main body 17*a*, and the aforesaid opening and closing lid 17*c* is mounted to the opening of the top face of the main body 17*a* to be openable and closable. The aforesaid carrying-out lever 17*e* is placed so that both the protruded portions are protruded inside through the hole 17*a*5, and the aforesaid cover 17*f* is provided to cover the carrying-out lever 17*e*. A solenoid (not shown, refer to reference numeral 26 in FIG. 5) for normally and reversely rotating the carrying-out lever 17*e* in a predetermined angle range is connected to the carrying-out lever 17*e* via a motion conversion link. A commodity carrying-out operation by the normal and reverse rotation of this carrying-out lever 17*e* is the same as the prize carrying-out unit 15 of the first embodiment, and therefore the explanation thereof will be omitted. The aforesaid prize selecting button 17*g* and the aforesaid display part 17*h* are provided at the front face portion of the main body 17*a***.

Incidentally, in the third embodiment, the aforesaid main body **17*a*, the prize carrying-out mechanism (the carrying-out lever 17*e*, the motion conversion link) and the solenoid construct "prize carrying-out means" for storing and carrying out the prize, and a number of packaged goods such as dolls, toys, badges and the like are stored in the prize storing chamber 17*a*2 of the main body 17*a* as the prizes 16** for promoting the sales. As the packages for holding the goods, separable spherical cases made of transparent plastic are preferably used, but the shapes and materials of the packages are not especially limited.

When the aforementioned prize carrying-out unit 17 is mounted to the main door 1, the front face portion of the prize carrying-out unit 17 is inserted into the opening **1*c*' from the back face side of the opening 1*c*' which is previously formed at the main door 1, then the screws SC are screwed into the back face of the main door 1, or brackets or the like provided at the back face through the screw insertion holes of the mounting flanges 17*a*6, and a lower end of the prize carrying-out port 17*a*4 is made to communicate with the commodity output port 14. Since the mounting flange 17*a*6 and the back face of the main door 1 are joined with each other via the packing PA, rainwater and the like do not enter an inside of the main door 1 through the opening 1*c***'.

It is naturally possible to remove the prize carrying-out unit 17 from the main door 1 by loosening the screws SC after mounting the unit. When the prize carrying-out unit 17 is not used, the opening **1*c*' of the main door 1 can be blocked with a special lid plate (not shown) from a back face side thereof or a front face side thereof after the unit 17** is removed.

Even if the opening **1*c*' is not previously formed at the main door 1, if a sufficient space for forming the opening 1*c*' at the front face of the main door 1 exists, and a sufficient space for mounting the prize carrying-out unit 17 exists at a back face side thereof, the aforementioned prize carrying-out unit 17 can be provided at the existing vending machine by performing an operation of forming the opening 1*c*' at the main door 1**.

According to the third embodiment, the prize 16 is carried out to the commodity output port 14 from the prize carrying-out unit 17 through the prize carrying-out port **17*a*4, and therefore it is not necessary to provide a special prize output port, thus making it possible to take the prize 16 from the commodity output port 14 similarly to the commodity. Since the prize carrying-out unit 17**, which does not have the prize output port at the front face, is used, the risk of tampering with the inside of the unit through the prize vending port at the front face can be avoided. The other operational effects are the same as in the first embodiment.

Figure 14:
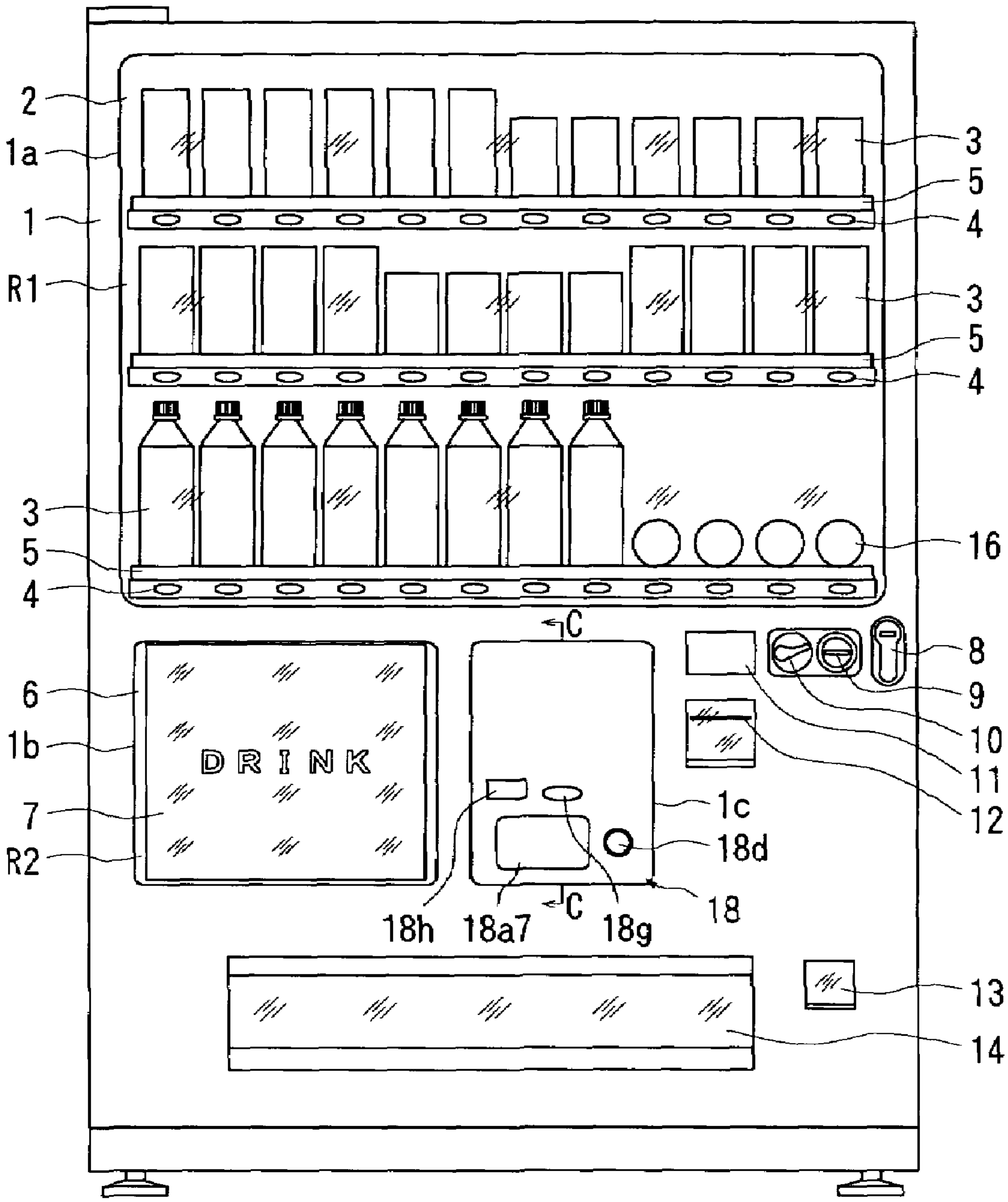
FIG. 14 is a front view of a vending machine showing a fourth embodiment of the present invention.
Figure 15:
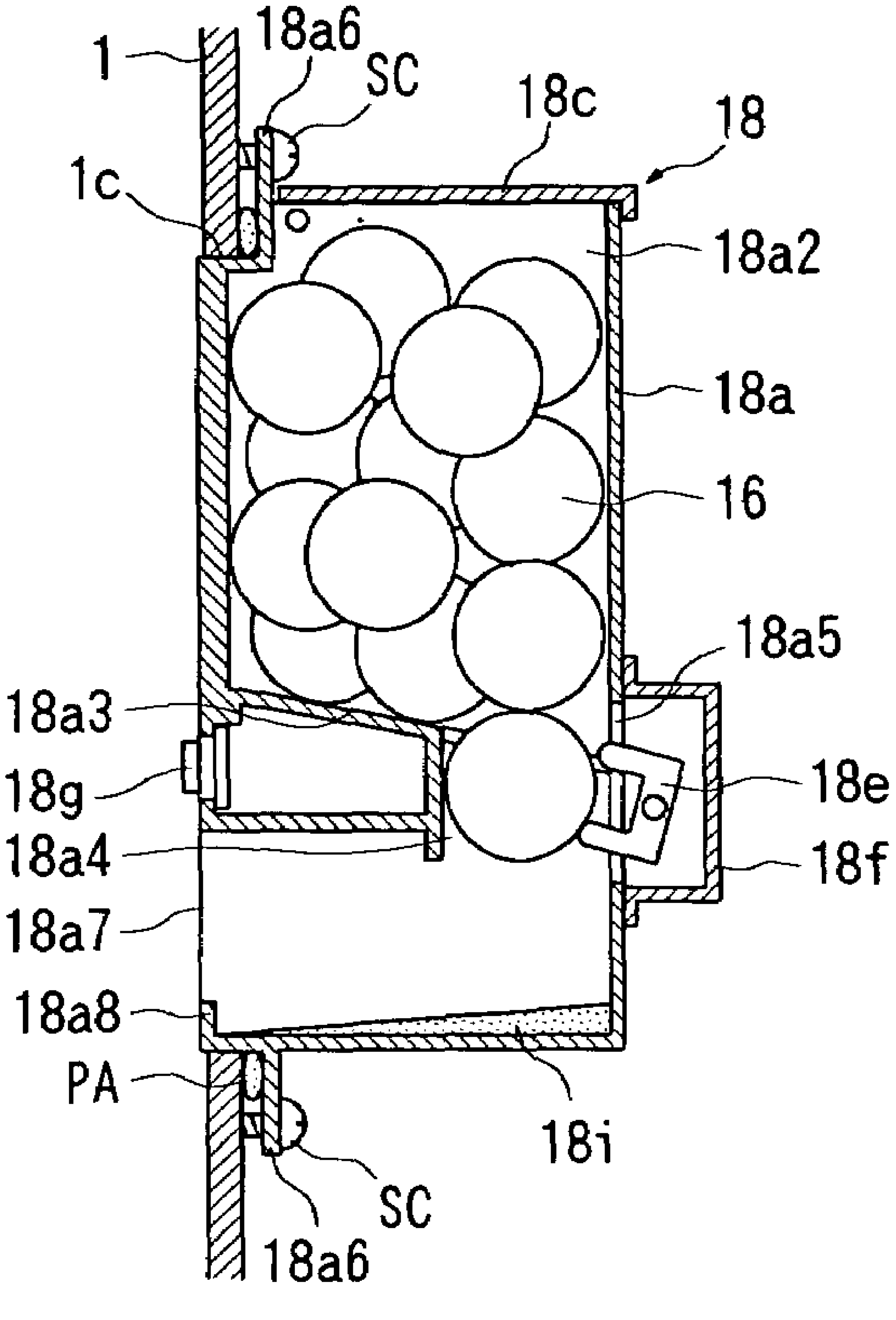
FIG. 15 is an enlarge sectional view taken along the line C—C in FIG. 14.

FIG. 14 and FIG. 15 show a fourth embodiment of the present invention.

The fourth embodiment differs from the aforementioned first embodiment in the point in which a prize carrying-out unit 18 that does not have the transparent plate at a front face, and the point in which the prize 16 housed in the prize carrying-out unit 18 or its samples are exhibited in the sample chamber R1 as samples 3. The other constructions are the same as in the first embodiment, and therefore the explanation thereof will be omitted.

The aforesaid prize carrying-out unit 18 includes a main body **18*a*, an opening and closing lid 18*c*, a lamp 18*d*, and a carrying-out lever 18*e* having protruded portions at an upper and lower position, a cover 18*f*, a prize selecting button 18*g*, a display part 18*h* showing a prize price and the like, and an impact absorbing mat 18*i*** made of synthetic rubber and the like.

The main body **18*a* has a top face opened. An inner space of the main body 18*a* is constructed as a prize carrying-out port 18*a*2, and a bottom face 18*a*3 of the prize storing chamber 18*a*2 is inclined toward a prize carrying-out port 18*a*4. A hole 18*a*5 for protruding an upper and lower protruded portions of a carrying-out lever 18*e* toward the prize storing chamber 18*a*2 and the prize carrying-out port 18*a*4 is formed at a back face of the main body 18*a*. Mounting flanges 18*a*6 with screw insertion holes being formed are provided at a perimeter of a front face side of the main body 18*a*, and packing PA made of synthetic rubber or the like are provided at front face sides thereof. A prize output port 18*a*7 is provided at a lower part of a front face of the main body 18*a*, and a stopper 18*a*8 for preventing the prize 16** from slipping off is provided at a lower end thereof.

The aforesaid opening and closing lid **18*c* is mounted to a top face opening of the main body 18*a* to be openable and closable. The aforesaid carrying-out lever 18*e* is placed so that both the protruded portions are protruded inside through the hole 18*a*5, and the aforesaid cover 18*f* is provided to cover the carrying-out lever 18*e*. A solenoid (not shown, refer to reference numeral 26 in FIG. 5) for normally and reversely rotating the carrying-out lever 18*e* in a predetermined angle range is connected to the carrying-out lever 18*e* via a motion conversion link. A commodity carrying-out operation by normal and reverse rotation of this carrying-out lever 18*e* is the same as the prize carrying-out unit 15 in the first embodiment, and therefore the explanation thereof will be omitted. The aforesaid prize selecting button 18*g* and the aforesaid display part 18*h* are provided at the front face portion of the main body 18*a***.

Incidentally, in the fourth embodiment, the aforesaid main body **18*a*, the prize carrying-out mechanism, (the carrying-out lever 18*e*, the motion conversion link) and the solenoid construct "prize carrying-out means" for storing and carrying out the prize, and a number of packaged goods such as dolls, toys, badges and the like are stored in the prize storing chamber 18*a*2 as the prizes 16** for sales promotion. As the packages for holding the goods, separable spherical cases made of transparent plastic are preferably used, but the shapes and the materials of the packages are not especially limited.

When the aforementioned prize carrying-out unit 18 is mounted to the main door 1, a front face portion of the prize carrying-out unit 18 is inserted into the opening 1*c* from a back face side of the opening 1*c*, which is previously formed at the main door 1, as shown in FIG. 15, and the screws SC are screwed into the back face of the main door or brackets or the like provided at the back face through the screw insertion holes of the mounting flanges 18*a*6. Since the mounting flange 18*a*6 and the back face of the main door 1 are joined with each other via the packing PA, rainwater and the like do not enter an inside of the main door 1 through the opening 1*c*.

It is naturally possible to remove the prize carrying-out unit 18 from the main door 1 by loosening the screws SC after mounting the unit. When the prize carrying-out unit 18 is not used, the opening 1*c* of the main door 1 is blocked with a special lid plate (not shown) from the back face side thereof or the front face side thereof after the unit 18 is removed.

Even if the opening 1*c* is not previously formed at the main door 1, if a sufficient space for forming the opening 1*c* exists at the front face of the main door 1, and a sufficient space for mounting the prize carrying-out unit 18 exists at the back face side thereof, the aforementioned prize carrying-out unit 18 can be mounted to the existing vending machine by performing an operation for forming the opening 1*c* at the main door 1.

According to the fourth embodiment, the prizes 16 or their samples are exhibited in the sample chamber R1 as the samples 3 and are made visible from an outside, and therefore the power of pulling buying public is enhanced by the visual effect to make it possible to contribute to the sales considerably. Since the prize carrying-out unit 18, which does not have the transparent plate at the front face, is used, the risk of tampering with an inside of the unit through the transparent plate at the front face can be avoided. The other operational effects are the same as in the first embodiment.

Figure 16:
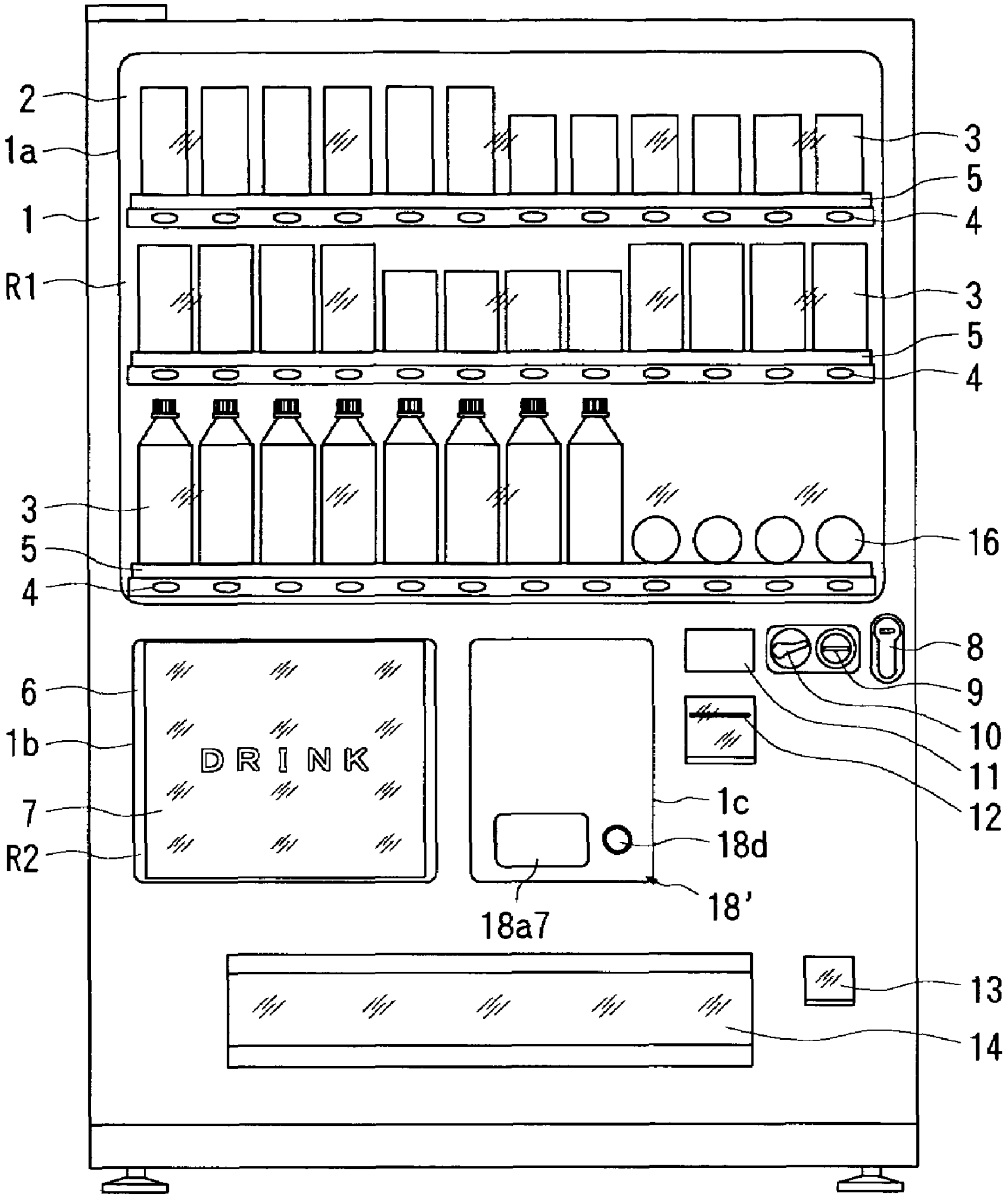
FIG. 16 is a front view of a vending machine showing a fifth embodiment of the present invention.

FIG. 16 shows a fifth embodiment of the present invention.

The fifth embodiment differs from the aforementioned fourth embodiment in the point in which a prize carrying-out unit 18' which does not have the prize selecting button 18*g* and the display part 18*h* at a front face, is used, in the point in which the commodity selecting buttons 4 corresponding to the prizes 16 or their samples exhibited in the sample chamber R1 are used as prize selecting buttons, and in the point in which the prize price and the like are displayed in the display part 5 inside the sample chamber R1. The other constructions are the same as in the fourth embodiment, and therefore the explanation thereof will be omitted.

According to the fifth embodiment, the prize can be selected when the fourth mode is carried out with use of the buttons 4 arranged correspondingly to the prizes 16 or their samples exhibited in the sample chamber R1, and a purchaser can buy a favorite prize while looking at exhibited the prizes 16 or their samples. The other operational effects are the same as in the fourth embodiment.

Figure 17:
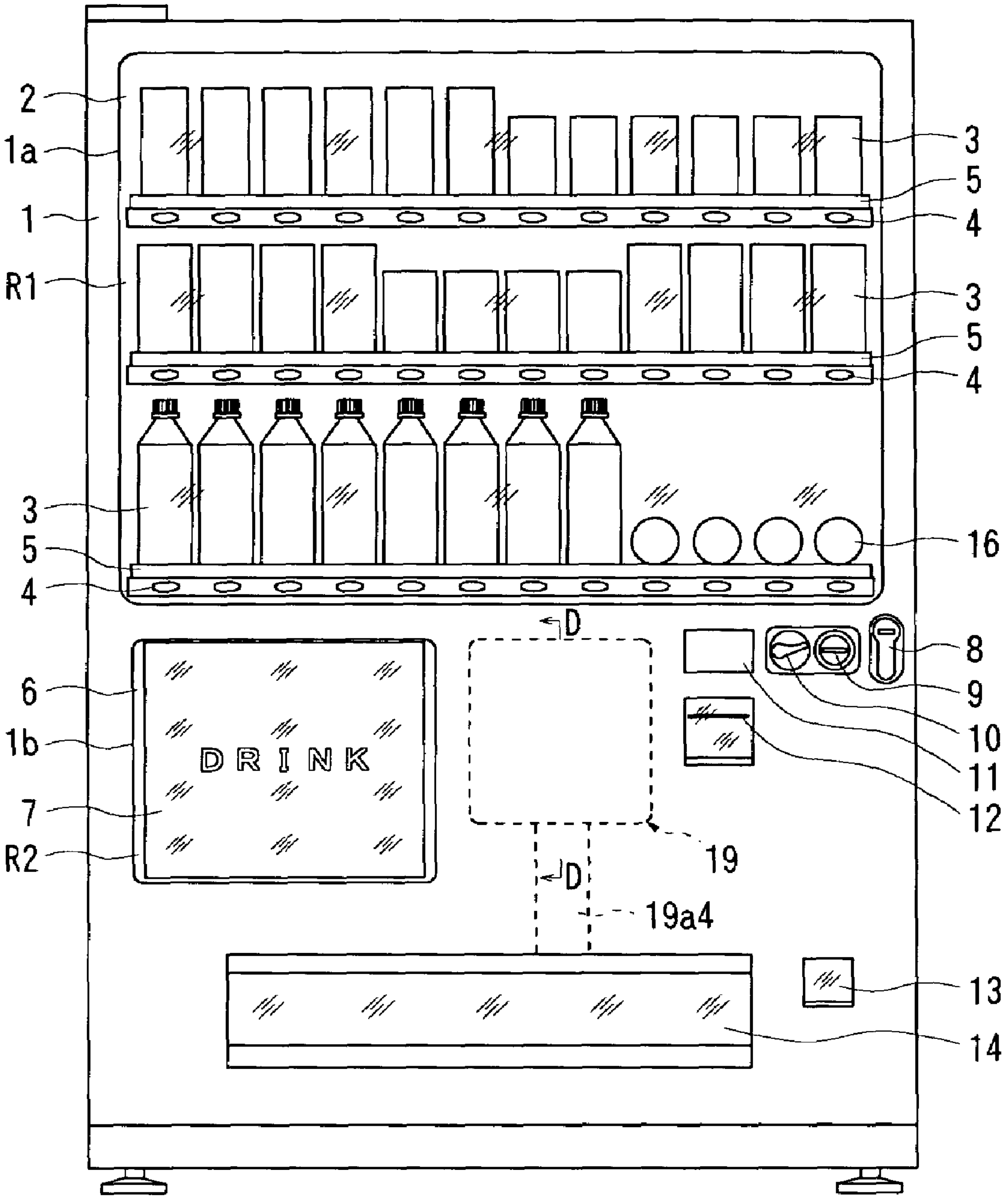
FIG. 17 is a front view of a vending machine showing a sixth embodiment of the present invention.
Figure 18:
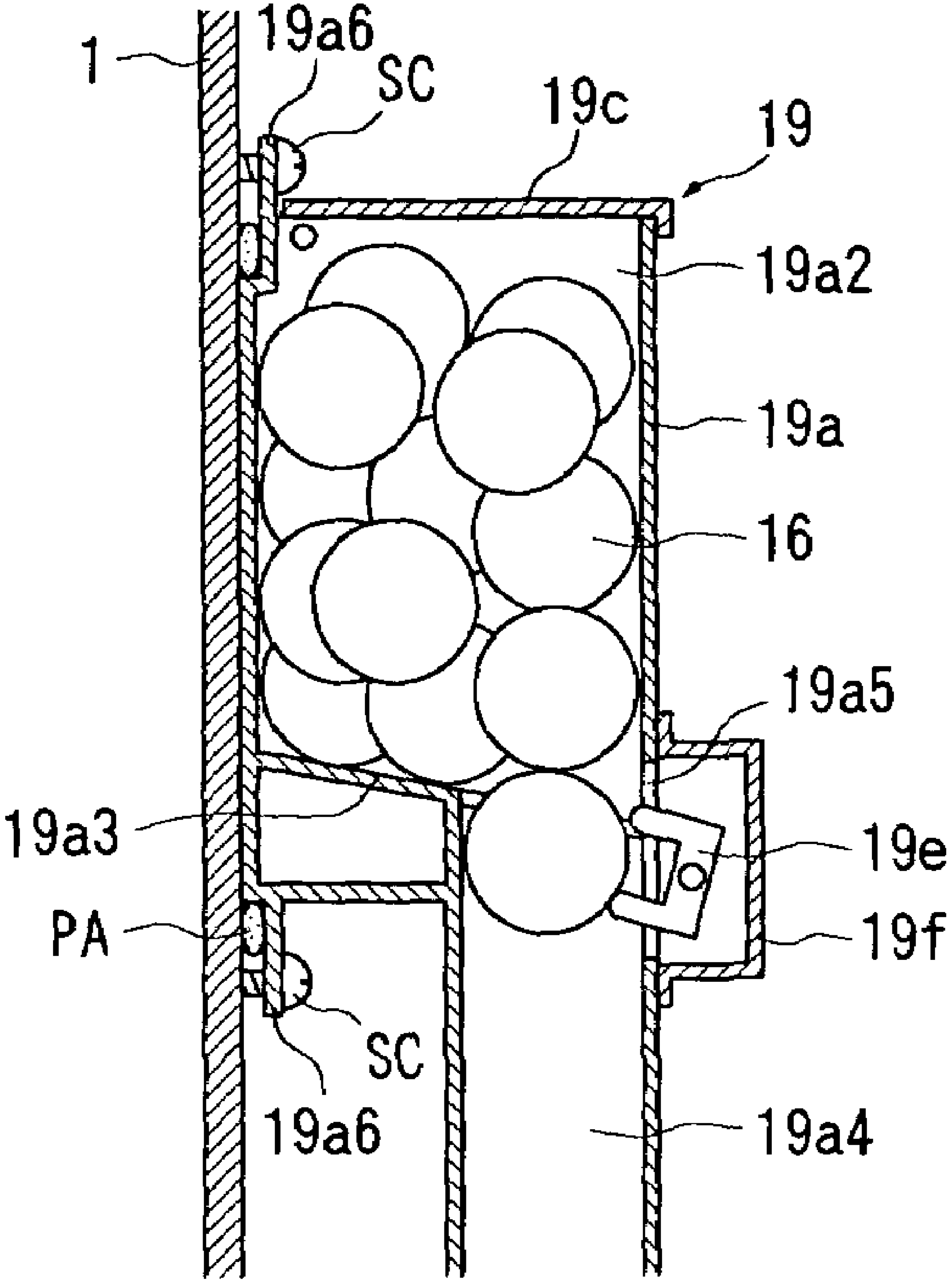
FIG. 18 is an enlarged sectional view taken along D—D line in FIG. 17.

FIG. 17 and FIG. 18 show a sixth embodiment of the present invention.

The sixth embodiment differs from the aforementioned first embodiment in the point in which a prize carrying-out unit 19, which does not have a lamp, a prize output port, a prize selecting button and a display part at a front face, is used, in the point in which the opening 1*c* for mounting the prize carrying-out unit is removed from the main door 1, in the point in which a prize carrying-out port 19*a*4 of the prize carrying-out unit 19 is extended downward to communicate with the commodity output port 14, in the point in which the prizes 16 stored in the prize carrying-out unit 19 or their samples are exhibited in the sample chamber R1 similarly to the samples 3, in the point in which the commodity selecting buttons 4 corresponding to the prizes 16 or their samples, which are exhibited in the sample chamber R1 are used as the sample selecting buttons, and in the point in which the prize prices and the like are displayed in the display part 5 inside the sample chamber R1. The other constructions are the same as in the first embodiment, and therefore the explanation thereof will be omitted. A impact absorbing mat (not shown) made of synthetic rubber or the like to protect the prizes 16 carried out from the prize carrying-out unit 19 through the prize carrying-out port 19*a*4 from a dropping impact is provided at a bottom face of the commodity output port 14.

The aforesaid prize carrying-out unit 19 includes a main body 19*a*, an opening and closing lid 19*c*, a carrying-out lever 19*e* which has protruded portions at an upper and lower positions, and a cover 19*f*, as shown in FIG. 18.

The main body 19*a* has a top face being opened. An inner space of the main body 19*a* is constructed as a prize storing chamber 19*a*2, a bottom face 19*a*3 of the prize storing chamber 19*a*2 is inclined toward the prize carrying-out port 19*a*4. A hole 19*a*5 for protruding the upper and lower protruded portions the upper and lower protruded portions of the carrying-out lever 19*e* toward the prize storing chamber 19*a*2 and the prize carrying-out port 19*a*4 is formed at a back face of the main body 19*a*. Mounting flanges 19*a*6 with screw insertion holes being formed are provided at a perimeter of a front face side of the main body 19*a*, and packing PA made of synthetic rubber or the like are provided at front face side thereof.

The aforesaid opening and closing lid 19*c* are mounted to a top face opening of the main body 19*a* to be openable and closable. The aforesaid carrying-out lever 19*e* is placed so that both the protruded portions are protruded inside through the hole 19*a*5, and the aforesaid cover 19*f* is provided to cover the carrying-out lever 19*e*. A solenoid (not shown, refer to reference numeral 26 in FIG. 5) for normally and reversely rotating the carrying-out lever 19*e* in a predetermined angle range is connected to the carrying-out lever 19*e* via a motion conversion link. A commodity carrying-out operation by normal and reverse rotation of this carrying-out lever 19*e* is the same as the prize carrying-out unit 15 of the first embodiment, and therefore the explanation thereof will be omitted.

Incidentally, in the sixth embodiment, the aforesaid main body 19*a*, a prize carrying out mechanism (the carrying-out lever 19*e*, the motion conversion link), and the solenoid construct “prize carrying-out means” for storing and carrying out the prizes, and a number of packaged goods such as dolls, toys, and badges are stored in the prize storing chamber 19*a*2 of the main body 19*a* as the prizes for sales promotion. As for the packages for holding the goods, separable spherical cases made of transparent plastic are preferably used, but the shapes and the materials of the packages are not specially limited.

When the aforementioned prize carrying-out unit 19 is mounted to the main door 1, the screws SC are screwed into the back face of the main door 1 or brackets or the like provided at the back face through the screw insertion holes of the mounting flanges 19*a*6, and a lower end of the prize carrying-out port 19*a*4 is made to communicate with the commodity output port 14, as shown in FIG. 18.

It is naturally possible to remove the prize carrying-out unit 19 from the main door 1 by loosening the screws SC after mounting the unit.

According to the sixth embodiment, the prize 16 is carried out to the commodity output port 14 from the prize carrying-out unit 19 through the prize carrying-out port 19*a*4, and therefore it is not necessary to provide a special prize output port, thus making it possible to take out the prize 16 from the commodity output port 14 similarly to the commodity. Since the prize carrying-out unit 17 is not exposed from the main door 1, the risk of tampering with the inside of the unit through the exposed portion can be avoided. Since prizes 16 or their samples are exhibited in the sample chamber R1 similarly to the samples 3 to make them visible from an outside, the power of pulling buying public is enhanced by the visual effect to make it possible to contribute the sales considerably. The prize selection can be performed when the fourth mode is carried out with use of the buttons 4 arranged correspondingly to the prizes 16 or their samples which are exhibited in the sample chamber R1, and the purchasers can buy their favorite prizes while looking at the exhibited prizes 16 or samples thereof. The other operational effects are the same as in the first embodiment.

As described above, in the first to the sixth embodiment, five kinds of modes can be selectively carried out by the mode selecting device 27, and if one, two, or three of the first to the fourth mode and the fifth mode are executed, the intended object can be sufficiently attained.

In the first to the sixth embodiment, the prize carrying-out units 15, 17, 18, 18' and 19 which are mounted to the main doors 1 are shown, but if the package shape of the prize 16 is formed into a shape storable in the commodity column such as the serpentine type column, and the prizes 16 is stored in the commodity column and is made capable of being carried out by the commodity carrying-out mechanism similarly to the commodity, carrying-out of the prizes in the first to the fourth mode can be performed without using the prize carrying-out unit. In other words, even when the space for mounting the prize carrying-out unit does not exist on the back face side of the main door, it is possible to store and carry out the prizes by utilizing the commodity columns as the prize storing chamber. In this case, if the prizes 16 or the samples thereof are exhibited in the sample chamber R1, the prize can be selected when the fourth mode is executed with use of the commodity selecting buttons 4 arranged correspondingly to the prizes 16 or the samples thereof.

In the first to the sixth embodiment, the carrying-out levers 15*e*, 17*e*, 18*e* and 19*e* for constructing the prize carrying-out mechanism, which have the protruded portions at the upper and lower positions, are shown, the levers in the other shapes may be used as the carrying-out lever if only it can carry out the prizes one by one, or a known carrying-out mechanism without the carrying-out lever may be used as the prize carrying-out mechanism.

The preferred embodiments described in this specification are exemplificative, and is not restrictive. The scope of the invention is shown by the accompanying claims, and all the modified examples within the meaning of the claims are included in the present invention.

What is claimed is:

1. A vending machine, comprising:

commodity carrying-out means for storing commodities and carrying out a commodity;

commodity carrying-out control means for executing carrying-out of the commodity from the commodity carrying-out means based on insertion of coins or a paper money and pushing a commodity selecting button;

prize carrying-out means for storing prizes different from the commodities and carrying out a prize;

prize carrying-out control means for executing carrying out of the prizes from the prize carrying-out means when a predetermined condition is satisfied; and mode selecting means for selecting any one of a mode which makes it possible to carry out the commodity and the prize and a mode which makes it possible to carry out only the commodity, wherein the prize carrying-out means has a transparent plate, which is capable of making an inside of a prize housing chamber visible, at a front face, and the prize carrying-out means is mounted inside a main door so that the transparent plate is exposed outside through an opening of the main door.

2. The vending machine according to claim 1, wherein the predetermined condition related to carrying-out of the prize is any one of selecting a special commodity at a time of selection of a commodity, and winning a prize in the lottery at a time of selection of the commodity other than the special commodity, and when any one of said conditions is satisfied in a state in which the mode which makes it possible to carry out the commodity and the prize is selected, the prize is carried out with the selected commodity.

3. The vending machine according to claim 1, wherein the prize carrying-out means has a prize output port at the front face, and the prize carrying-out means is mounted inside the main door so that the prize output port is exposed outside through an opening of the main door.

4. The vending machine according to claim 1, wherein the prize carrying-out means has a prize selecting button at a part exposed from the main door.

5. The vending machine according to claim 1, wherein the predetermined condition related to carrying-out of the prize is winning a prize in the lottery at a time of selection of the commodity, and when said condition is satisfied in a state in which the mode which makes it possible to carry out the commodity and the prize is selected, the prize is carried out with the selected commodity.

6. The vending machine according to claim 1, wherein the predetermined condition related to carrying-out of the prize is selecting of a special commodity at a time of selection of the commodity, and when said condition is satisfied in a state in which the mode which makes it possible to carrying out the commodity and the prize is selected, the prize is carried out with the selected commodity.

7. The vending machine according to claim 1, wherein the predetermined condition related to carrying-out of the prize is an inserted amount of money greater than or equal to a prize price, and pushing a prize selecting button;

when said condition is satisfied in a state in which the mode which makes it possible to carry out the commodity and the prize is selected, only the prize is carried out; and when a condition of the inserted amount of money greater than or equal to a commodity price and pushing the commodity selecting button is satisfied, only the commodity is carried out.

* * * * *